United States Patent
Collado et al.

(10) Patent No.: US 6,675,824 B2
(45) Date of Patent: Jan. 13, 2004

(54) VALVE WITH WILDER OPENING AND PRESSURE REGULATOR EQUIPPED WITH SUCH A VALVE

(75) Inventors: Pedro Collado, Ozoir la Ferriere (FR); Christian Bleys, Livry sur Seine (FR)

(73) Assignee: Taema, Antony Cedex (FR)

( * ) Notice: Subject to any disclaimer, the term of this patent is extended or adjusted under 35 U.S.C. 154(b) by 81 days.

(21) Appl. No.: 10/023,883

(22) Filed: Dec. 21, 2001

(65) Prior Publication Data

US 2002/0078993 A1 Jun. 27, 2002

(30) Foreign Application Priority Data

Dec. 21, 2000 (FR) .............................. 00 16760

(51) Int. Cl.[7] .............................................. G05D 16/10
(52) U.S. Cl. .................................. 137/116.5; 137/484.4
(58) Field of Search .......................... 137/116.5, 484.2, 137/484.4, 540

(56) References Cited

U.S. PATENT DOCUMENTS 2,655,936 A  10/1953  Wexler et al.
2,868,460 A  * 1/1959  Hansen et al. .............. 137/540
3,286,725 A  * 11/1966  Elbogen et al. .......... 137/484.2

FOREIGN PATENT DOCUMENTS

| DE | 1 220 688 | 11/1959 |
| WO | WO 98/08012 | 2/1998 |
| WO | WO 98/30859 | 7/1998 |

* cited by examiner

Primary Examiner—Stephen M. Hepperle
(74) Attorney, Agent, or Firm—Young & Thompson

(57) ABSTRACT

A valve having a valve body (1) including an internal chamber (21) of axis (AA) having an upstream compartment (21a) of diameter (Dam) and a downstream compartment (21b) of diameter (Dav), with Dam<Dav. A fluid inlet orifice (10) is formed in the wall of the valve body (1) and opens into the upstream compartment (21a). A piston body (2) that can move in translation along the axis (AA) inside the internal chamber (21) and which is located between the fluid inlet orifice (10) and a fluid outlet orifice, has a front face (2a) located on the same side as the fluid inlet orifice (10), a rear face (2b) located on the same side as the fluid outlet orifice, and a lateral wall (2c) located between the front face (2a) and the rear face (2b). The lateral wall (2c) has a cylindrical first portion (P1) of diameter (D1) and a cylindrical second portion (P2) of second diameter (D2), with D1<D2 and D2<Dav.

19 Claims, 2 Drawing Sheets

VALVE WITH WILDER OPENING AND PRESSURE REGULATOR EQUIPPED WITH SUCH A VALVE

BACKGROUND OF THE INVENTION

The invention relates to a valve with wider opening for a pressure regulator. The valves incorporated into pressure regulators allow slow pressure rises in the low-pressure circuit to be discharged and thus provide the installation situated downstream with fairly good protection.

The pressure rises are generally caused by dirt becoming lodged between the seat and the valve element.

In general, present-day valves are able to palliate this kind of fault.

However, safety problems may arise in pressure reducers for high-pressure compressed gas cylinders, generally for pressures ranging from 150 bar to 300 bar, or even beyond 300 bar.

Specifically, for these high pressures, the major risks, apart from the slow rises described hereinabove, are any sudden overpressures that may, by way of an exception, be caused by the pressure reducing valve element becoming jammed in the open position, following an operating defect such as a blockage or seizure.

In this case, the high-pressure gas arrives suddenly in the low-pressure chamber. If the valve does not react and open quickly enough and to a sufficient extent to remove this high-pressure gas, the regions customarily subjected to low pressure run the risk of not being able to withstand the pressure, and bursting may occur.

The standards regarding industrial pressure reducers or ones for medical gases incorporate the operating rules for these valves which are recalled, in particular, in document FR-A-9606925.

However, in the specific case of high throughput pressure reducers, existing valves do not open sufficiently to be able to absorb the high throughputs.

Furthermore, mention may be made of document WO-A-98/30859, which describes the gas pressure regulator for a paintball gun making it possible to reduce the pressure of a gas at high pressure. This device comprises a piston that can move in a chamber comprising three successive compartments, which piston is normally pushed back by a spring against a piston seat formed by the wall of the intermediate compartment. Because of the configuration of this device, the front face of the piston never comes into contact with the end wall of the upstream compartment into which the gas whose pressure is to be reduced enters, and this does not allow the valve to open wide enough in the event of a sudden increase in the amount of gas that is to be supplied.

Furthermore, mention may also be made of documents DE-A-1220688, WO-A-98/08012 and U.S. Pat. No. 2,655,936 which describe devices of crude design for regulating the pressure of a fluid.

SUMMARY OF THE INVENTION

It is therefore an object of the invention to produce a discharge valve incorporating the constraints set by international standards, to limit the abovementioned risks, while at the same time remaining of a simple design.

Stated in a different way, the present invention sets out to propose a quick-reacting discharge valve with wider opening, with an opening accuracy the adjustment of which does not slip, and which is extremely repeatable, more specifically intended for regulators for compressed gas cylinders or high-pressure medical or industrial pressure-reducing plant in which the throughput demand is high.

The solution afforded by the present invention is therefore a valve comprising:
 a valve body comprising:
  an internal chamber of axis (AA) comprising an upstream compartment and a downstream compartment, the said upstream compartment being of cylindrical cross section and of diameter (Dam) and the said downstream compartment being of cylindrical cross section and of diameter (Dav), with Dam<Dav,
  at least one fluid inlet orifice formed in the wall of the said valve body and opening into the upstream compartment of the internal chamber, and
  at least one fluid outlet orifice, and
 a piston body that can move in translation along the axis (AA) inside at least one part of the said internal chamber and is located between the said fluid inlet orifice and the said fluid outlet orifice, the said piston body having a front face located on the same side as the fluid inlet orifice, a rear face located on the same side as the fluid outlet orifice, and a lateral wall located between the said front face and the said rear face, the said lateral wall of the piston body having at least a first portion (P1) of cylindrical cross section and of first diameter (D1) and at least a second portion (P2) of cylindrical cross section and of second diameter (D2), with D1<D2 and D2<Dav, and in which the wall of the said valve body has an internal face forming the end wall of the upstream compartment, against which face the front face of the piston body normally bears.

As the case may be, the valve of the invention may have the following characteristics:
 the second diameter (D2) of the second portion (P2) is approximately equal to the diameter (Dam) of the valve body;
 when the piston body moves in translation along the axis (AA) and in the direction that tends to move it away from the fluid inlet orifice, the second portion (P2) of the lateral wall of the piston body passes in succession from the upstream compartment to the downstream compartment of the internal chamber so as to open a space allowing fluid to flow between the lateral wall of the said second portion (P2) of the piston body and the wall internal to the downstream compartment of the internal chamber;
 the front face of the piston body comprises sealing means;
 part of the downstream compartment of the internal chamber comprises an elastic means which normally exerts a thrusting force on the rear face of the piston body, along the axis (AA) and in the direction that tends to bring the front face of the piston body closer to the internal face of the said valve body, the elastic means preferably being a spring;
 at least one fluid inlet orifice opens onto the internal face of the upstream compartment, the fluid inlet orifice preferably opening towards the centre of the internal face;
 the first portion (P1) of first diameter (D1) is located upstream of the second portion (P2) of second diameter (D2) when considering the direction in which a fluid flows as it passes in turn from the upstream compartment to the downstream compartment;

a sealing means is formed in the internal peripheral wall of the upstream compartment so as to provide a fluidic seal between the said upstream compartment and the said downstream compartment, when the second portion (P2) of the lateral wall of the piston body is positioned facing the said sealing means, the said sealing means preferably being an annular seal;

a leakage orifice is formed through the second portion (P2) of the lateral wall of the piston body so as to place the downstream compartment in fluidic communication with that part of the upstream compartment that is located between the said second portion (P2) of the lateral wall of the piston body and the front face of the piston body;

regulating means collaborate with the elastic means so that the thrusting force exerted on the rear face of the piston body can be regulated or adjusted;

it is formed of at least a first subunit and of a second subunit which are fixed together, the first subunit including at least the upstream compartment and at least one fluid inlet orifice, and the second subunit comprising at least one fluid outlet orifice, it preferably being possible for the two subunits to be fitted one inside the other.

According to another aspect, the invention also relates to a pressure regulating device making it possible to regulate or adjust the pressure of a fluid, particularly a gas, comprising such a valve.

According to yet another aspect, the invention relates to a pressure regulating device making it possible to regulate or adjust the pressure of a fluid, particularly a gas, comprising a main body comprising an internal fluid passage comprising a high-pressure fluid inlet and a low-pressure fluid outlet and means for reducing the pressure of the fluid being arranged, in a fluid pressure reducing chamber, between the said high-pressure fluid inlet and the said low-pressure fluid outlet, characterized in that the said fluid pressure reducing chamber is in fluidic communication with at least one fluid inlet orifice formed in the wall of a valve body and opening into the upstream compartment of the internal chamber of a valve according to the invention.

Furthermore, the invention also relates to a container for pressurized fluid, equipped with such a pressure regulating device, particularly a gas cylinder, or a pipe for pressurized fluid, equipped with such a pressure regulating device or with a valve according to the invention.

DETAILED DESCRIPTION OF THE PREFERRED EMBODIMENTS

Figure 1:
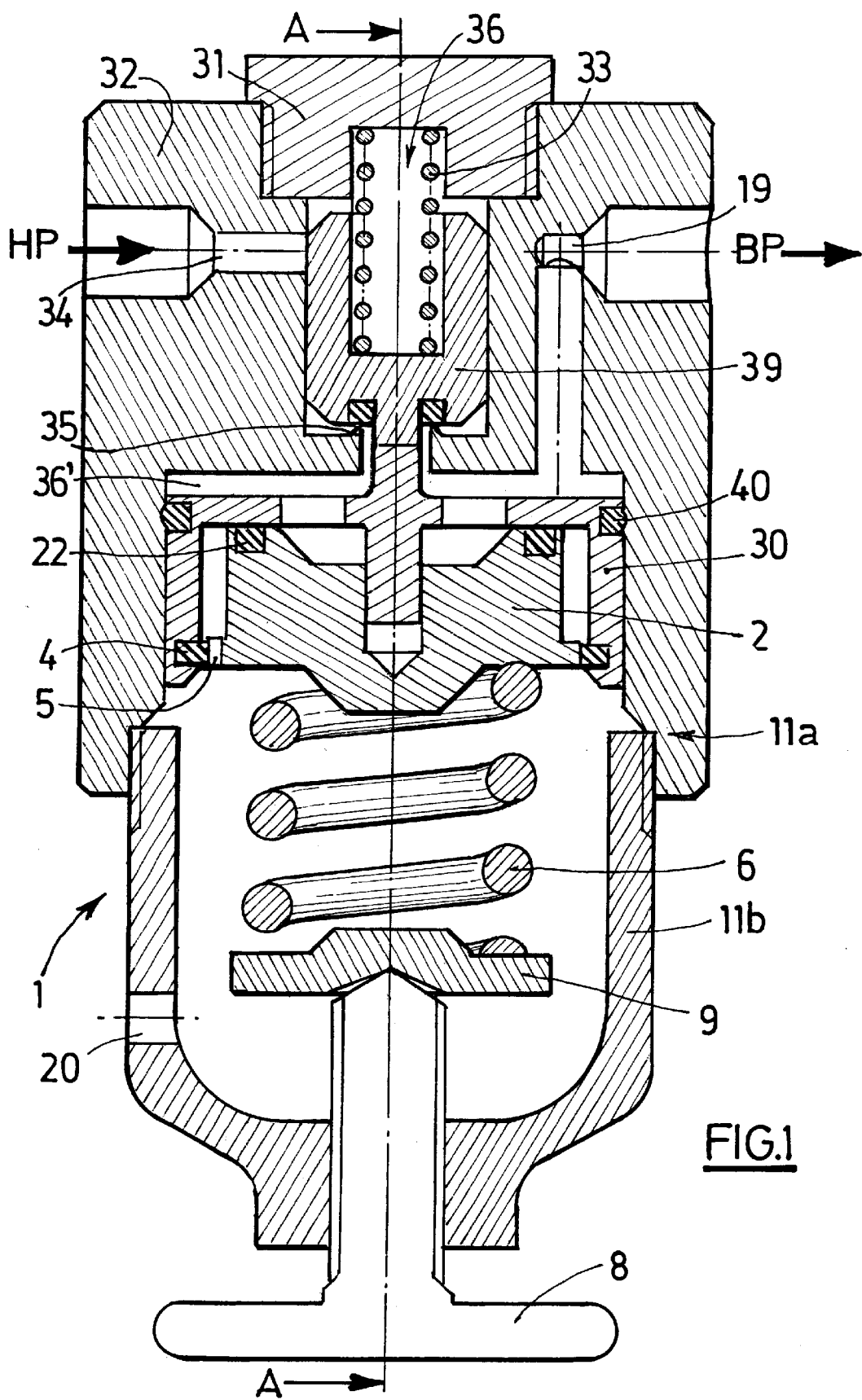
FIG. 1 shows a first embodiment of a valve according to the invention incorporated into a gas pressure reducer.

FIG. 1 shows a diagram of a pressure reducer for a high-pressure compressed-gas cylinder, the reducer being made up of a body 32 in which a seat 35 is formed, of a valve element 39 bearing against the seat 35 by virtue of the force exerted by a pressing spring 33, with the assembly being contained in a high-pressure chamber 36 closed by a screw plug 31. High-pressure (HP) gas is supplied via the gas inlet orifice 34.

In the lower part of the body 32, the low-pressure chamber 36' is formed between the body 32 and the piston 30, an O-ring 40 sealing the piston 30 with respect to the outside.

The reduced and regulated pressure is led out towards an outlet orifice 19.

The regulation of the pressure reduced in the chamber 36' is determined by the equilibrium between the axial compression force of the pressure reducing spring 6 and the axial force resulting from the pressure exerted on the outside diameter of the piston 30. The pressure is regulated by virtue of the pressure reducing screw 8 which bears against the spring centre 9 which itself bears against the spring 6.

Formed in the piston 30 are passages for supplying the valve body 2 of the valve 1 if the pressure rises. The valve is formed of a solid metal body 2, the front face 2a of which is fitted with a seal 22 which bears against the flat end wall 1a of the piston 30 thus acting as a seat.

The diameter of the seal 22 is chosen so that the valve opens at a clearly defined value with respect to the initial setting of the pressure in the chamber 36'.

The large sealing surface formed by the seal 22 makes it possible to obtain good sensitivity on the opening threshold and instantaneous reaction when there is a sudden and sharp rise in the overpressure, this being true by virtue of instantaneous increase in the opening of the valve.

In order to meet safety criteria, the throughput of the valve needs to be taken into consideration to allow the sudden overpressure to be removed completely. This throughput value is generally defined for a pressure level equal to twice the reduced pressure. It is considered that, at this value, the throughput should not be below the manufacturer's stated throughput for the pressure reducer because if it were, the throughput delivered by the valve could prove insufficient.

According to the invention, the opening of the valve is made wider so that it gives a greater passage cross section and meets the abovementioned throughput criteria.

To do this, the piston 2 has two successive internal diameters D1 and D2, one matched to the diameter (D1≈Dam) of the O-ring 4 acting as an opening widener, and the other being small enough to form a large passage cross section with the seal (reference 8) when the valve is fully disengaged from this seal.

The widening of the opening is also rendered possible by virtue of collaboration between the end wall of the upstream compartment 21a and the front face 2a of the piston body 2. What happens according to the invention is that the wall of the valve body 1 has an internal face 1a forming the end wall of the upstream compartment 21a and against which face the front face 2a of the piston body 2 normally bears.

This makes it possible to create an instantaneous opening as soon as the valve 2 separates from the face 2a under the effect of an overpressure applied to a larger area corresponding to the diameter Dam, thus creating the desired wider opening.

The throughput of gas which escapes from the valve is then removed through a passage orifice 20.

Furthermore, a leakage orifice 5 is formed between the two diameters of the piston 2 of the valve and the outside beyond the seal 4 so as to allow the valve to close normally when the overpressure has disappeared.

Another particular feature of the invention lies in the fact that when the valve according to the invention is incorporated into a gas pressure reducer as shown in FIG. 1, then the said valve remains separate from the pressure reducing piston, that is to say that the pressure reducing piston 30 remains operational while the valve may perform its safety function. This has the advantage that there is always a pressure reducer ready to regulate as soon as the valve has finished performing its function, when the problem of overpressure has disappeared.

Figure 2:
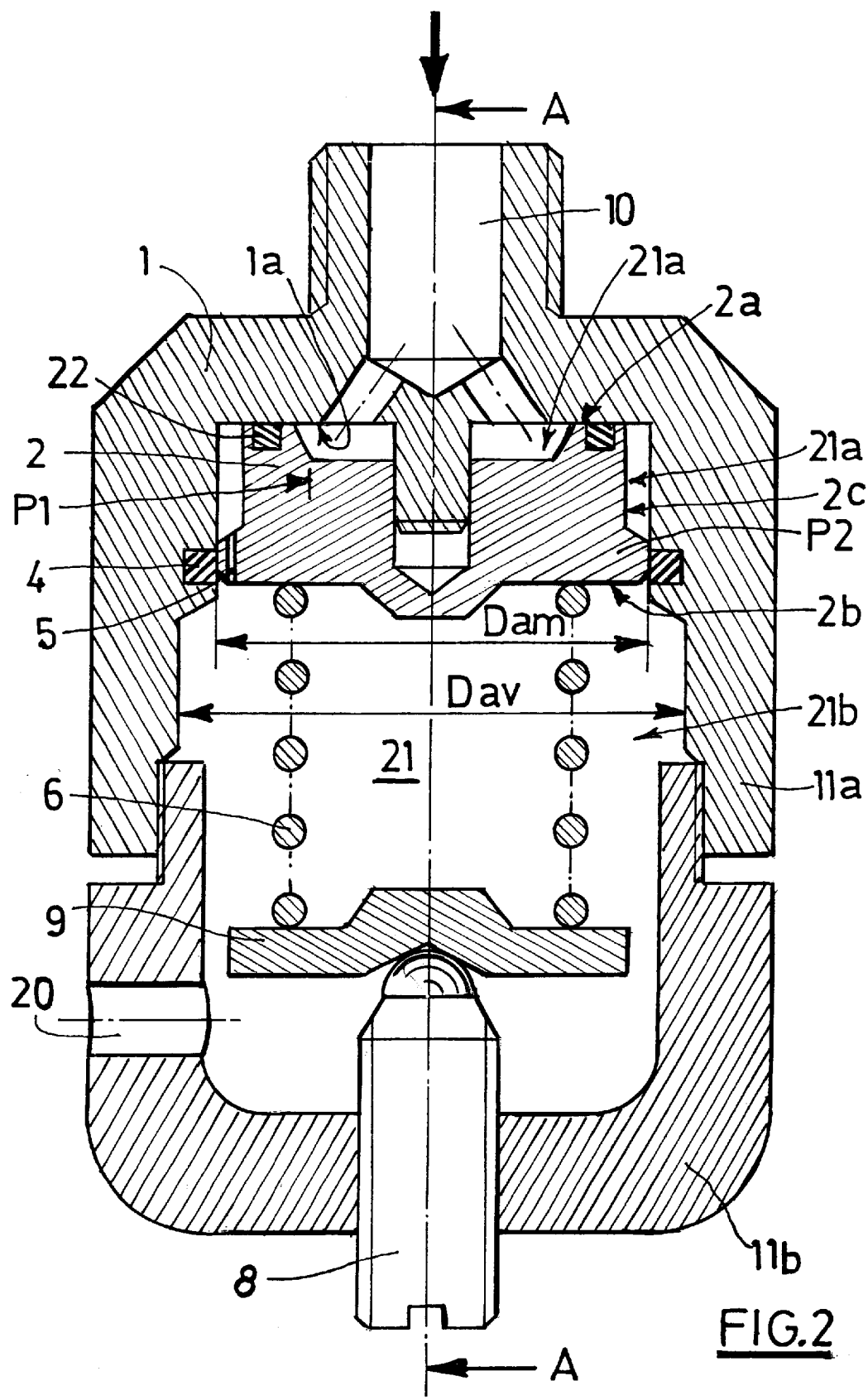
FIG. 2 shows a stand alone version, that is to say one not incorporated into a pressure reducer.

FIG. 2 schematically shows a stand alone valve intended to be connected to a circuit, the maximum pressure of which needs to be controlled.

This valve is made up of a body 1 with a threaded inlet 10 accommodating the piston of the valve and resting against the flat end wall 1a of the body 1 and the two successive diameters D1 and D2.

A groove has been formed in the body to house an O-ring.

The spring 6 makes it possible to adjust the pressure threshold level by presetting the screw 8 which bears against the spring centre 9.

The orifice 20 formed in the valve bonnet 11b allows excess pressure and throughput escaping from the valve and collected at the point of entry to be removed.

What is claimed is:

1. Valve comprising:
    a valve body comprising:
        an internal chamber having a longitudinal axis comprising an upstream compartment and a downstream compartment, said upstream compartment being of cylindrical cross section and of diameter Dam and said downstream compartment being of cylindrical cross section and of diameter Dav, with Dam<Dav,
        at least one fluid inlet orifice formed in the wall of said valve body and opening into the upstream compartment of the internal chamber, and at least one fluid outlet orifice; and
        a piston body movable in translation along the longitudinal axis inside at least one part of said internal chamber and located between said fluid inlet orifice and said fluid outlet orifice,
        said piston body having a front face located on a same side as the fluid inlet orifice, a rear face located on a same side as the fluid outlet orifice, and a lateral wall located between said front face and said rear face,
        said lateral wall of the piston body having at least a first portion of cylindrical cross section and of first diameter D1 and at least a second portion of cylindrical cross section and of second diameter D2, with D1<D2, D2<Dav, and D2<Dam,
        a wall of said valve body has an internal face forming an end wall of the upstream compartment, the front face of the piston body normally bearing against said internal face.

2. Valve according to claim 1, wherein, when the piston body moves in translation along the longitudinal axis and in the direction that tends to move it away from the fluid inlet orifice, the second portion of the lateral wall of the piston body passes in succession from the upstream compartment to the downstream compartment of the internal chamber so as to open a space allowing fluid to flow between the lateral wall of said second portion of the piston body and the wall internal to the downstream compartment of the internal chamber.

3. Valve according to claim 1, wherein the front face of the piston body comprises sealing means.

4. Valve according to claim 3, wherein at least part of the downstream compartment of the internal chamber comprises an elastic means which normally exerts a thrusting force on the rear face of the piston body, along the longitudinal axis and in a direction that tends to bring the front face of the piston body closer to the internal face of said valve body.

5. Valve according to claim 3, wherein at least one fluid inlet orifice opens onto the internal face of the upstream compartment.

6. Valve according to claim 1, wherein the first portion of the first diameter D1 is located upstream of the second portion of second diameter D2 when considering the direction in which a fluid flows as it passes in turn from the upstream compartment to the downstream compartment.

7. Valve according to claim 1, wherein a sealing means is formed in the internal peripheral wall of the upstream compartment so as to provide a fluidic seal between said upstream compartment and said downstream compartment, when the second portion of the lateral wall of the piston body is positioned facing said sealing means.

8. Valve according to claim 1, wherein a leakage orifice is formed through the second portion of the lateral wall of the piston body so as to place the downstream compartment in fluidic communication with that part of the upstream compartment that is located between said second portion of the lateral wall of the piston body and the front face of the piston body.

9. Valve according to claim 1, wherein regulating means collaborate with the elastic means so that the thrusting force exerted on the rear face of the piston body can be regulated or adjusted.

10. Valve according to claim 1, wherein the valve is formed of at least a first subunit and of a second subunit which are fixed together, the first subunit including at least the upstream compartment and at least one fluid inlet orifice, and the second subunit comprising at least one fluid outlet orifice.

11. Pressure regulating device making it possible to regulate or adjust the pressure of a fluid, comprising a valve according to claim 1.

12. Pressure regulating device making it possible to regulate or adjust the pressure of a fluid, comprising a main body comprising an internal fluid passage comprising a high-pressure fluid inlet and a low-pressure fluid outlet and means for reducing the pressure of the fluid being arranged, in a fluid pressure reducing chamber, between said high-pressure fluid inlet and said low-pressure fluid outlet, wherein said fluid pressure reducing chamber is in fluidic communication with at least one fluid inlet orifice formed in the wall of a valve body and opening into the upstream compartment of the internal chamber of a valve according to claim 1.

13. Container for pressurized fluid, equipped with a pressure regulating device according to claim 12.

14. Pipe for pressurized fluid, equipped with a pressure regulating device according to claim 11.

15. The valve according to claim 3, wherein said sealing means is an O-ring.

16. The valve according to claim 4, wherein the elastic means is a spring.

17. The valve according to claim 5, wherein the fluid inlet orifice opens toward a center of the internal face.

18. The valve according to claim 7, wherein the sealing means is an annular seal.

19. The valve according to claim 10, wherein one of the first and second subunits is fitted inside another one of the first and second subunits.

* * * * *